Nov. 22, 1932.  O. OTTERSON  1,888,539
PIPE COUPLING
Filed Jan. 6, 1932  2 Sheets-Sheet 1
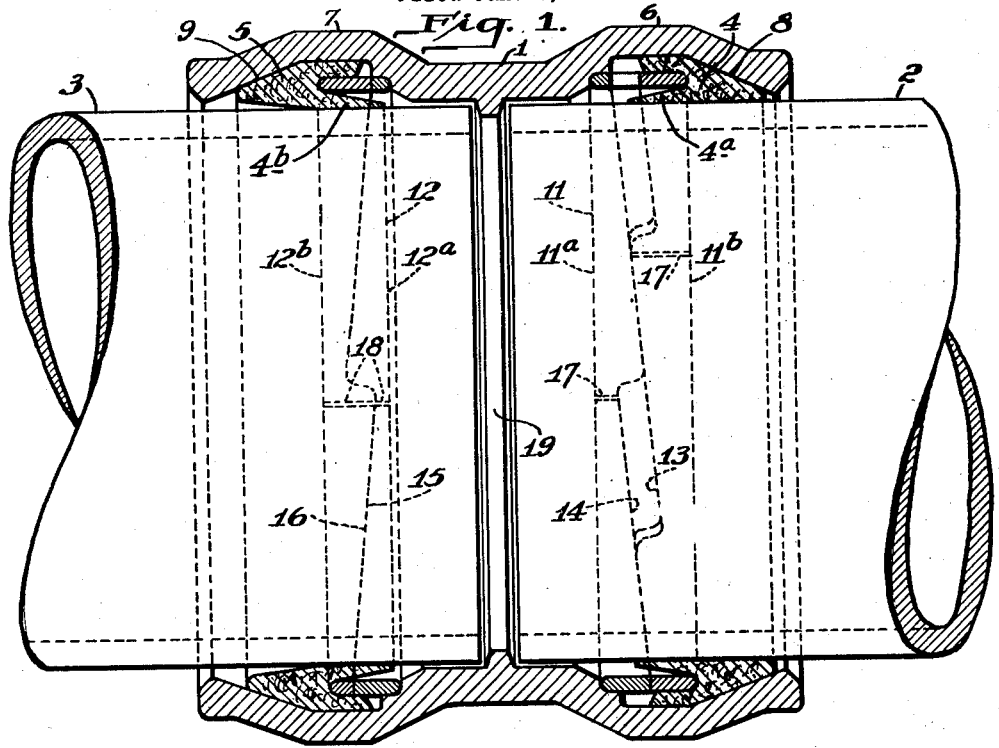
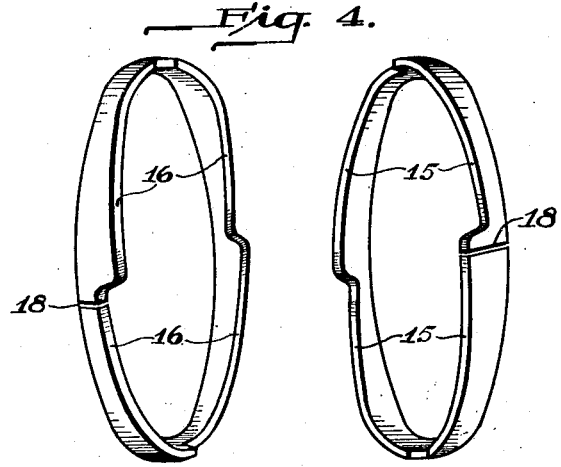
WITNESSES  
INVENTOR  
Oscar Otterson  
by Brown & Critchlow  
his attorneys

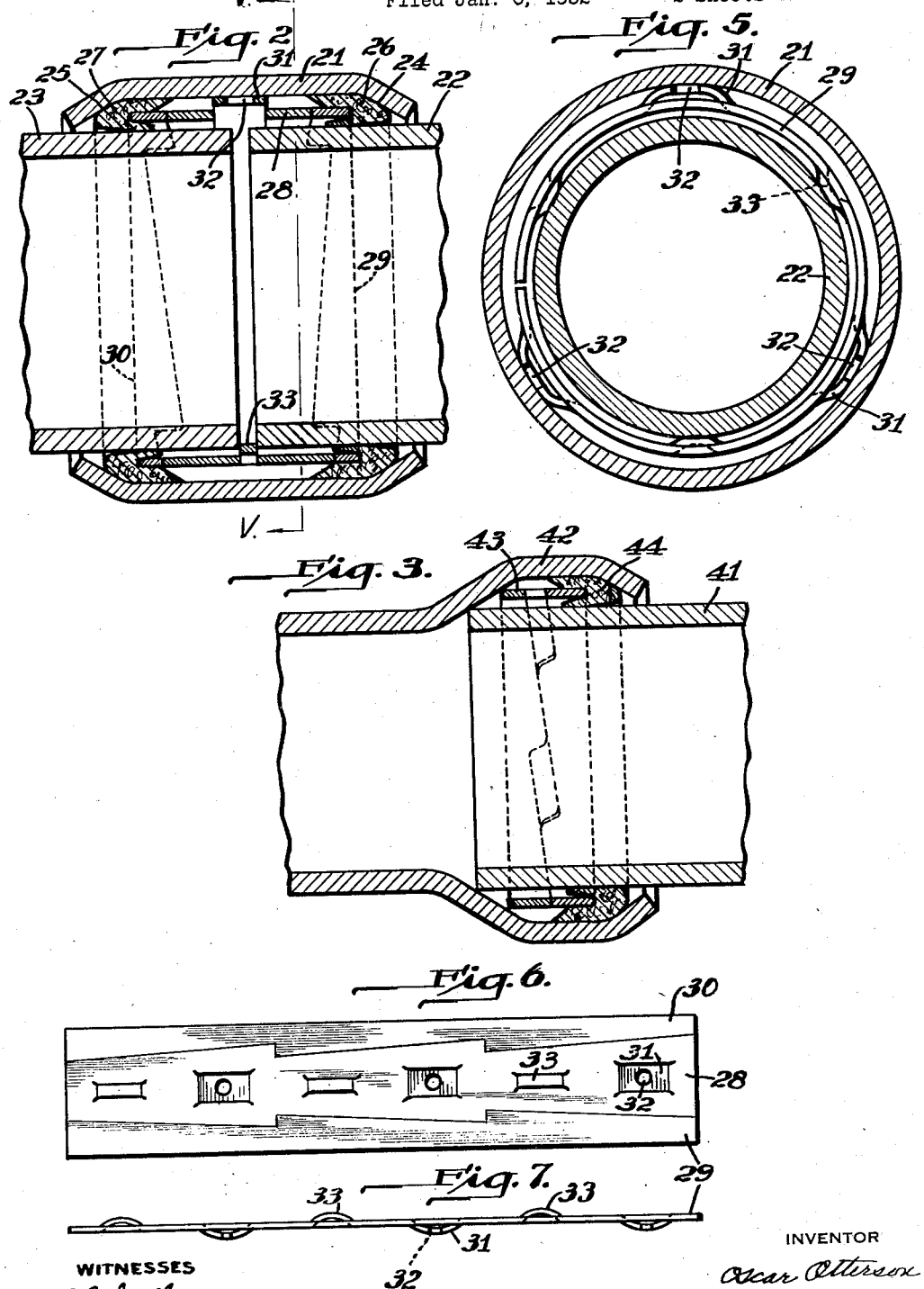

Patented Nov. 22, 1932

1,888,539

UNITED STATES PATENT OFFICE

OSCAR OTTERSON, OF BUTLER, PENNSYLVANIA

PIPE COUPLING

Application filed January 6, 1932. Serial No. 584,963.

This invention relates to pipe couplings of the type in which a packing gasket is employed to effect a seal and which utilize the pressure of the fluid conveyed through the pipes, as well as mechanical means for compressing the packing gasket to produce the seal, and has for its object, generally stated, the provision of a coupling of this character which is simple of construction, dependable in operation, easy to manufacture and install, and in which the difficulties heretofore experienced in assembling pipes where a packing gasket is employed in the coupling are overcome.

A further object is to provide a coupling of the above noted type which is particularly adapted for use in large pipe lines which will permit a limited amount of disalignment between the pipes and which may be easily and effectively assembled in the field with a minimum effort and with a minimum number of coupling elements.

These and other objects as well as the various other novel features and advantages of the invention will be apparent from the following detailed description read in conjunction with the accompanying drawings, of which Fig. 1 is a sectional view of a coupling constructed in accordance with the invention and designed for use in joining the ends of adjacent smooth ended pipes; Fig. 2 a similar view of a modified form of the invention; Fig. 3 a sectional view of a joint made between a smooth ended and a bell ended pipe employing a seal embodying the invention; Fig. 4 a perspective view of one of the expansible retaining rings employed in the structures shown in Figs. 1 and 3; Fig. 5 a view taken on the line V—V of Fig. 2; and Figs. 6 and 7, plan and side views, respectively, of the seal supporting and expanding sections of the coupling shown in Fig. 2 showing them laid out in a horizontal plane.

Referring first to the embodiment of the invention illustrated in Fig. 1, the numeral 1 designates the housing proper of the coupling which is adapted to loosely fit over or receive the abutting ends of adjoining smooth ended pipes 2 and 3. For providing a seal between the inner wall of the housing and the periphery of the pipes, a pair of preferably substantially wedge-shaped annular flexible sealing gaskets 4 and 5 are provided. For effecting a seal in accordance with the invention the end portions 6 and 7 of the housing are belled outwardly to receive the gaskets and have their outer extremities 8 and 9 tapered inwardly toward the pipes for forcing the gasket into sealed engagement with the pipes when they are forced outwardly after the pipes are in place. To utilize the pressure of the fluid in the pipe for forcing them in such directions the housing at its central portion is made with an inner diameter which is somewhat greater than the outer diameter of the pipes, thus permitting the gaskets to be exposed to the pressure, and their inner faces are preferably so made as to react most effectively in the manner referred to such pressure.

In couplings of this character, as heretofore practiced, in which gaskets such as those noted above are used, considerable difficulty is frequently experienced when the couplings are assembled due to the gaskets getting out of place and fouling the ends of the pipe when placed in the coupling housings and seating improperly with resulting leakage due to such displacement. Also, where the pressure in the pipes is relied upon to seat the gaskets such seating does not take place if there is any such displacement or the gasket does not fit properly as the pressure will then pass under and about the gasket, or if there is insufficient pressure present to force the gasket to a sealed seat.

For overcoming these difficulties in my coupling I provide a pair of expansible supporting and pressure producing rings 11 and 12. The duties of these rings are principally two-fold. First they are used to hold gaskets 4 and 5 in place in the bell portions 6 and 7 of the housing, so that they will not be disturbed when the housing is handled or when the pipes 2 and 3 are placed in it. Secondly, they are employed to provide a convenient means for forcing the gaskets tightly into a seal-forming position when the coupling is assembled. To perform the first of these duties they are made sufficiently wide to bear against the back or inner walls of the bells 6 and 7 and also engage the inner face of the gaskets 4 and 5 with sufficient force to hold them in place, while to function in their other capacity, that is, as pressure generating elements, they are split in a zigzag fashion about their peripheries between their two ends into two parts 11a and 11b and 12a and 12b, the line of this split being such as to provide a plurality of tapering surfaces 13 and 14 and 15 and 16 which cause the sections 11a and 11b and 12a and 12b to be forced apart when one of them is rotated relative to the other. This feature is brought out in Fig. 1 by the showing of the rings and gaskets at the opposite ends of the coupling. It will be noted that the ring at the left end is indicated in its collapsed position, the two sections being in surface contact with each other over their full length while the ring at the opposite end is shown with its sections 11a and 11b expanded, one of the sections having been rotated relative to the other to cause the inclined surface 13 of the one to ride upon the inclined surface 14 of the other, and force the two apart and at the same time force gasket 4 into seal-tight engagement with the inner wall of housing 1 and the outer wall of the tube 2.

To facilitate the expanding of the ring sections when the coupling is assembled, and for aiding in holding the rings in place in the coupling housing the inner sections 11a and 12a of the two rings are preferably rigidly attached to the housing. This may be done in any suitable fashion such as by spot or otherwise welding them to the housing, and to facilitate their insertion in the housing they may be split at 17 and 18 so that they may be overlapped sufficiently to readily pass through the ends of the housing.

In assembling the couplings the rings 11 and 12 are first put in place and attached to the housing and the gaskets 4 and 5 then inserted, all of which may be done in the shop if desired. When the joint is actually made the ends of the pipes are merely slid into housing 1 being centered by an annular flange 19 provided in the housing. Then the housing is turned until rings 11 and 12 are expanded sufficiently to provide the necessary pressure on gaskets 4 and 5 to give a satisfactory initial seal, the spreading of the ring sections being effected due to the parts 11a and 12a of the rings being fixed to the housing, the parts 11b and 12b frictionally engaging the gaskets which in turn frictionally engage the walls of the pipes and hold them from turning with the housing. To assure that the gaskets will have enough resistance against the pipes, the gaskets are provided with contracting lips 4a and 4b which pull tightly over the pipe and tightly grip the ring parts 11b and 12b so that both will travel with the pipe when the housing is turned.

In the modification of the invention shown in Figs. 2, 5, 6 and 7, a coupling housing 21 is formed by a section of tubing having a somewhat larger inner diameter than the outer diameters of the pipes 22 and 23 which it joins together. To form inclined surfaces 24 and 25 for engaging the gaskets 26 and 27 employed in the coupling its outer ends are swaged inwardly at their extremities. In this embodiment of the invention, instead of two separate gasket-engaging rings, a triple section ring is provided and adapted to both hold the two gaskets in place and force them against the ends of the housing to provide a seal. This ring consists of a central section 28 and a pair of outer sections 29 and 30 both of which are split from section 28 along zigzag or irregular lines such as described hereinbefore to adapt them for forcing the gaskets 26 and 27 toward the ends of the coupling when the inner section is rotated relative to them. A simple method of forming this type of coupling is to make the housing in the aforementioned fashion by swaging inwardly the end of a suitably sized piece of tubing and stamping the inner sections from a piece of flat plate in the manner shown in Figs. 6 and 7, then bending the sections 28, 29 and 30 to shape, and placing them in the housing. The swaging of the housing can, of course, be done before or after ring 28 is put in place.

For anchoring section 28 in housing 21, loops 31 may be struck outwardly from the center of this member and attached in any suitable fashion to the housing. For example, they may be spot welded to such part of the coupling or holes 32 may be punched in them and the edges of these seam-welded to the housing. For also adapting this section of the coupling to engage the ends of the pipes in such a way as to centralize them in the coupling when the coupling is assembled, loops 33 may be struck inwardly from its center and forced toward the inner center of the coupling sufficiently to engage the ends of the pipes.

Referring to Fig. 3, a joint is illustrated showing how the invention may be employed in connection with the joining of a smooth ended pipe 41 and a bell ended pipe 42. With such a joint the outer extremity of the bell portion of the bell ended pipe is swaged inwardly similar to the ends of the housing section of the coupling shown in Fig. 2, and for providing a seal for the joint a double section ring 43 such as that described in connection with Fig. 1 and shown perspectively in Fig. 4 is mounted in the belled pipe with its inner section attached thereto and its outer engaging a gasket 44 which is also mounted in the bell. With such a construction the preferred method of assembly is to lay the smooth ended pipe first and then insert the bell end thereover and turn the belled pipe sufficiently to separate the sections of the sealing ring an amount necessary to force the sealing gasket tightly against the inner walls of the bell and the outer surface of the smooth ended pipe.

According to the provisions of the patent statutes, I have explained the principle and mode of operation of my invention, and have illustrated and described what I now consider to represent its best embodiments. However, I desire to have it understood that, within the scope of the appended claims, the invention may be practiced otherwise than as specifically illustrated and described.

I claim:—

1. In combination, a pipe provided with a bell shaped end having an inwardly tapered portion at the outer end of its bell, a smooth ended pipe fitted in said bell, an annular flexible gasket of tapered cross section mounted in the bell of said outer pipe to bear on its opposite sides against the tapered surface adjacent the outer end of said bell and the outer wall of said smooth pipe, and a ring member mounted in said bell with one end disposed in a groove in said gasket in such a way as to hold said gasket in place and be frictionally engaged thereby, said ring being split about its periphery along an irregular line and its end opposite said gasket attached to said bell adapting its parts to be separated by relative rotary movement of the pipes for forcing said gasket between the outer inwardly tapered portion of the bell and the outer wall of the inner pipe to form a seal therebetween.

2. In combination, a bell ended pipe provided with an inwardly tapered portion at the outer end of its bell, a smooth ended pipe loosely fitted in said bell, whereby permitting any pressure in said pipes being communicated to said bell, an annular gasket having a tapered cross section mounted in said bell to bear on its opposite sides against the tapered surface adjacent the outer end thereof and the outer surface of the inner pipe and adapted to be forced toward sealed engagement with said surfaces by the pressure in the pipes, and an expansion ring split into two sections between its ends along an irregular line and mounted with one end attached to said bell and the other frictionally engaging said gasket for normally holding said gasket in place while at the same time adapting the gasket to cause the free end of said ring to move with said inner pipe to thereby force the gasket outwardly into sealed engagement between the inner and outer surfaces of the two pipes when one of them is turned relative to the other.

3. In combination, a bell ended pipe having the outer end of its bell tapered inwardly, a smooth ended pipe fitted in the bell of said first-mentioned pipe, an annular flexible gasket of irregular cross section arranged within said bell to frictionally engage the outer wall of said smooth pipe and bear against the tapered surface at the end of said bell, and a split retainer ring mounted within said bell in a manner to normally hold said gasket in place, said ring being split along a zig-zag line about its periphery dividing it into two sections the inner one of which is attached to the bell and the outer frictionally engaged by the gasket whereby said outer part is adapted to be rotated relative to the other when one of said pipes is rotated, and the two to be thereby separated forcing the gasket into sealing contact with the inner and outer surfaces of the two pipes.

4. In combination, a bell ended pipe having the outer end of its bell tapered inwardly, a smooth ended pipe fitted in the bell of said first-mentioned pipe, an annular flexible gasket of irregular cross section arranged within said bell and adapted to frictionally engage the outer wall of said smooth pipe and engage the tapered surface at the end of said bell, and a split retainer ring mounted within said bell in a manner to normally hold said gasket in place, said ring being split along a zig-zag line about its periphery dividing it into two sections the inner one of which is attached to the bell and the outer frictionally engaged in said gasket to cause it to move with said inner pipe and gasket, the zig-zagging being so shaped as to provide a plurality of identically formed equally spaced inclined surfaces between the two ring parts, which causes one of the parts to move parallel to the other in an axial direction when one of said pipes is rotated relative to the other to rotate one of said ring parts relative to the other, whereby the sealing gasket is forced into sealing contact between the two pipes.

5. A pipe joint comprising a tubular coupling housing having belled portions provided at its opposite ends and the outer ends of said bells tapered inwardly, a pair of abutting smooth ended pipes fitted in said bells, a sealing gasket of irregular cross section mounted in each of said bells to frictionally engage the outer surfaces of said pipes and engage the inner tapered surfaces of said bells adjacent the end thereof, and retaining means in the form of a pair of sectional expansible band rings mounted in said bells with the inner end of each attached to the bell adjacent thereto and the other frictionally engaging said gaskets in a manner to normally hold the gaskets in place and cause the free ends of said rings to move with said inner pipes, said rings being split about their periphery between their ends along an irregular line adapting them to move said gaskets outwardly into sealed contact with the aforementioned surfaces of said housing and pipes when a relative turning is effected therebetween.

6. A pipe joint comprising a tubular coupling housing having belled portions provided at its opposite ends and the outer ends of said bells tapered inwardly, a pair of abutting smooth ended pipes fitted in said bells, a sealing gasket mounted in each of said bells to frictionally engage the outer surfaces of said pipes and bear against the inner tapered surfaces of said bells adjacent the end thereof, and a retaining ring also mounted in each of said bells for normally holding said gaskets in place, said rings being split peripherally between their two ends along an irregular line to adapt their two parts to be separated axially when one part is rotated relative to the other, one part of each being attached to the bell and the other frictionally engaged in said gasket whereby causing a separation of the two when a relative rotation is effected between said housing and said pipes to force said sealing gaskets outwardly into sealing contact with the inner surfaces of the bells and the outer surfaces of the pipes.

7. A pipe joint comprising a coupling housing consisting of a section of tubing having its two ends tapered inwardly, a pair of abutting smooth ended pipes mounted in said housing, an annular sealing gasket mounted in each end of said housing in frictional engagement with the outer wall of the pipe fitted therein and arranged to bear against the tapered inner surface of the housing, and a multiple section gasket retaining member anchored in said housing and arranged to engage the gaskets at the two ends of the housing and hold them in place, said element being split peripherally along irregular lines equally spaced from its two ends into three sections, consisting of a main inner section which is fixedly attached to the housing and a pair of outer loose sections which are frictionally engaged in said gaskets and adapted by reason of their being split from the main section along an irregular line to separate from the main section when a relative rotary movement is effected therebetween and whereby the outer sections are adapted to force said gaskets outwardly into their sealing positions when said housing is rotated relative to said pipes.

8. A pipe joint according to claim 7 in which the multiple section gasket retaining element consists of a tube somewhat smaller than the coupling housing and has portions of the center section of the ring forced outwardly and attached to the housing, and other portions in the center thereof forced inwardly to engage the ends of the pipes.

9. A pipe joint according to claim 1 characterized by the expansible gasket retaining band rings being split transversely to adapt them to be collapsed and forced into the end of the bell-ended pipe when they are assembled.

In testimony whereof, I sign my name.
OSCAR OTTERSON.